(12) United States Patent
Arndt et al.

(10) Patent No.: US 10,255,194 B2
(45) Date of Patent: *Apr. 9, 2019

(54) CONFIGURABLE I/O ADDRESS TRANSLATION DATA STRUCTURE

(71) Applicant: INTERNATIONAL BUSINESS MACHINES CORPORATION, Armonk, NY (US)

(72) Inventors: Richard L. Arndt, Austin, TX (US); Benjamin Herrenschmidt, Narrabundah Act (AU); Eric N. Lais, Tillson, NY (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/095,738

(22) Filed: Dec. 3, 2013

(65) Prior Publication Data

US 2014/0129797 A1 May 8, 2014

Related U.S. Application Data

(63) Continuation of application No. 13/670,009, filed on Nov. 6, 2012.

(51) Int. Cl.
*G06F 12/02* (2006.01)
*G06F 12/1027* (2016.01)
*G06F 12/1081* (2016.01)

(52) U.S. Cl.
CPC ...... *G06F 12/1027* (2013.01); *G06F 12/0223* (2013.01); *G06F 12/1081* (2013.01); *G06F 2206/1004* (2013.01)

(58) Field of Classification Search
CPC . G06F 12/023; G06F 12/0292; G06F 12/0871
See application file for complete search history.

(56) References Cited

U.S. PATENT DOCUMENTS 5,701,495 A 12/1997 Arndt et al.
5,905,898 A 5/1999 Qureshi et al.
(Continued)

OTHER PUBLICATIONS

Aono et al., "The AzusA 16-Way Itanium Server," NEC, pp. 1-7; 0272-1732 2000 IEEE.
(Continued)

*Primary Examiner* — Ann J Lo
*Assistant Examiner* — Leandro R Villanueva
(74) *Attorney, Agent, or Firm* — Brian F. Russell; Steven L. Bennett

(57) ABSTRACT

In response to a determination to allocate additional storage, within a real address space employed by a system memory of a data processing system, for translation control entries (TCEs) that translate addresses from an input/output (I/O) address space to the real address space, a determination is made whether or not a first real address range contiguous with an existing TCE data structure is available for allocation. In response to determining that the first real address range is available for allocation, the first real address range is allocated for storage of TCEs, and a number of levels in the TCE data structure is retained. In response to determining that the first real address range is not available for allocation, a second real address range discontiguous with the existing TCE data structure is allocated for storage of the TCEs, and a number of levels in the TCE data structure is increased.

4 Claims, 9 Drawing Sheets

(56) References Cited

U.S. PATENT DOCUMENTS

| | | | |
|---|---|---|---|
| 7,398,427 B2 | 7/2008 | Arndt et al. | |
| 7,577,814 B1* | 8/2009 | Yakovlev | 711/170 |
| 7,613,847 B2 | 11/2009 | Kjos et al. | |
| 2002/0108025 A1* | 8/2002 | Shaylor | 711/203 |
| 2003/0046484 A1* | 3/2003 | Lasser | 711/103 |
| 2005/0091644 A1* | 4/2005 | Chilimbi | 717/128 |
| 2005/0289250 A1 | 12/2005 | Mulla et al. | |
| 2006/0010276 A1 | 1/2006 | Arndt et al. | |
| 2006/0069899 A1* | 3/2006 | Schoinas et al. | 711/206 |
| 2006/0112254 A1* | 5/2006 | Piper et al. | 711/171 |
| 2006/0195623 A1 | 8/2006 | Arndt et al. | |
| 2006/0282603 A1 | 12/2006 | Onufryk et al. | |
| 2007/0198614 A1* | 8/2007 | Zhang | G06F 3/061 |
| 2008/0168186 A1 | 7/2008 | Gregg | |
| 2008/0270706 A1* | 10/2008 | Fair | G06F 3/061 |
| | | | 711/137 |
| 2010/0058026 A1* | 3/2010 | Heil et al. | 711/207 |
| 2010/0281233 A1* | 11/2010 | Obr | G06F 17/30067 |
| | | | 711/173 |
| 2011/0320644 A1* | 12/2011 | Craddock et al. | 710/22 |
| 2012/0297118 A1* | 11/2012 | Gorobets et al. | 711/103 |
| 2014/0129795 A1* | 5/2014 | Arndt et al. | 711/206 |

OTHER PUBLICATIONS

Huang et al., "Ally: OS-Transparent Packet Inspection Using Sequestered Cores," pp. 1-8; Second Workshop on I/O Virtualization (WIOV '10), Mar. 13, 2010, Pittsburgh, PA.

Fraser et al., "Safe Hardware Access with the Xen Virtual Machine Monitor," pp. 1-10; Intel Research—University of Cambridge Computer Laboratory, J J Thomson Avenue, Cambridge, UL.

Raj et al., "Scalable I/O Virtualization via Self-Virtualizing Devices," pp. 1-20; CERCS, College of Computing, Georgia Institute of Technology, Atlanta, GA and IBM T.J. Watson Research Lab, Yorktown, NY.

Nilsson et al., "Android Virtualization," pp. 1-39; Columbia University, May 13, 2009.

Krause et al., "I/O Virtualization and Sharing," (slides) pp. 1-56; PCI Express, 2006, PCI-SIG.

Arndt et al. U.S. Appl. No. 13/670,009, filed Nov. 6, 2012—Non Final Office Action dated Aug. 7, 2014.

Arndt et al. U.S. Appl. No. 13/670,009, filed Nov. 6, 2012—Non Final Office Action dated Mar. 2, 2015.

Arndt et al. U.S. Appl. No. 13/670,009, filed Nov. 6, 2012—Final Office Action dated Sep. 28, 2015.

Arndt et al. U.S. Appl. No. 13/670,009, filed Nov. 6, 2012—Non Final Office Action dated Mar. 10, 2016.

Arndt et al. U.S. Appl. No. 13/670,009, filed Nov. 6, 2012—Final Office Action dated Sep. 22, 2016.

Arndt et al. U.S. Appl. No. 13/670,009, filed Nov. 6, 2012—Examiners Answer dated Mar. 2018.

Arndt et al. U.S. Appl. No. 13/670,009, filed Nov. 6, 2012—Revised Examiners Answer dated Feb. 12, 2018.

Arndt et al. U.S. Appl. No. 13/670,009, filed Nov. 6, 2012—Notice of Allowance dated Nov. 6, 2018.

* cited by examiner

US 10,255,194 B2

CONFIGURABLE I/O ADDRESS TRANSLATION DATA STRUCTURE

PRIORITY CLAIM

This application is a continuation of U.S. patent application Ser. No. 13/670,009, entitled "CONFIGURABLE I/O ADDRESS TRANSLATION DATA STRUCTURE," filed on Nov. 6, 2012, the disclosure of which is incorporated herein by reference in its entirety for all purposes.

BACKGROUND OF THE INVENTION

The present invention relates in general to data processing, and in particular, to input/output (I/O) in a data processing system.

A data processing system may include multiple processing elements and multiple input/output adapters (IOAs) to support connections to communication networks, storage devices and/or storage networks, and peripheral devices. In such data processing systems, the hardware resources of the data processing system may be logically partitioned into multiple, non-intersecting sets of resources, each controlled by a respective one of multiple possibly heterogeneous operating system instances. The operating systems concurrently execute on this common hardware platform in their respective logical partitions (LPARs) under the control of system firmware, which is referred to as a virtual machine monitor (VMM) or hypervisor. Thus, the hypervisor allocates each LPAR a non-intersecting subset of the resources of the data processing system, and each operating system instance in turn directly controls its distinct set of allocable resources, such as regions of system memory and IOAs.

In general, the IOAs in a data processing system employ an I/O address space that is distinct from the physical (real) address space utilized to address system memory in the data processing system. Consequently, address translation tables, referred to in the art as translation control entry (TCE) tables, are employed to translate addresses between the I/O address space and the real address space of the data processing system.

SUMMARY OF THE INVENTION

Translation control entry (TCE) tables conventionally employ either a monolithic (i.e., a single-level) structure, or alternatively, a multi-level structure having a predetermined number of levels. Monolithic TCE tables can provide improved performance because only a single memory access is required to obtain any translation between the I/O address space and the real address space. Multi-level TCE tables, on the other hand, are generally easier to manage because the storage locations for the additional translations required as the data processing system continues to run need not be contiguous with other portions of the TCE table and are therefore easier to allocate within the real address space.

In at least one embodiment, a configurable TCE data structure is implemented that can be configured to employ one or more levels of TCE tables to hold TCEs for translating between the I/O address space and real address space of a data processing system.

DETAILED DESCRIPTION OF ILLUSTRATIVE EMBODIMENT

Figure 1:
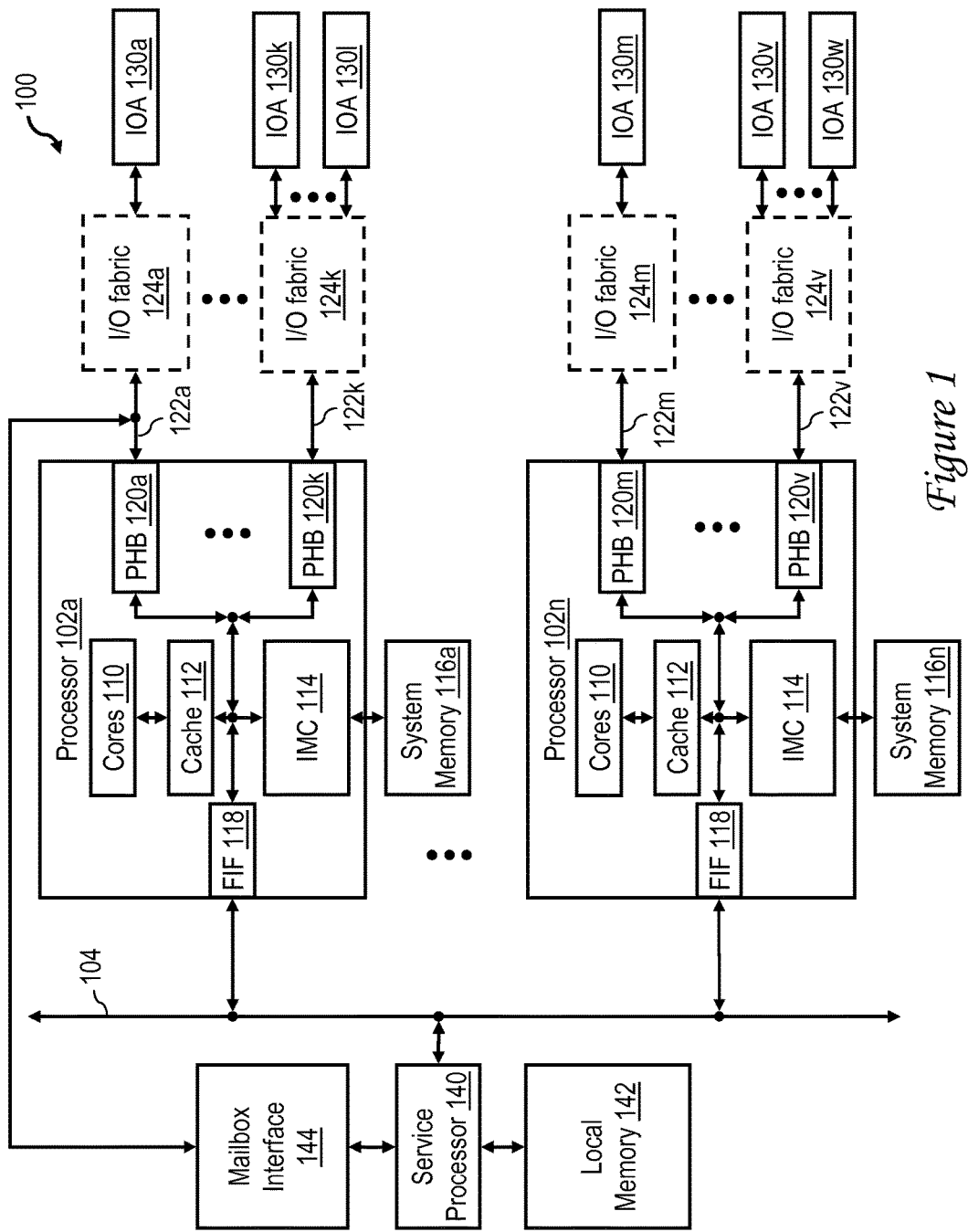
FIG. 1 is a high level block diagram of an exemplary data processing system in accordance with one embodiment.

With reference now to the figures, and in particular with reference to FIG. 1, there is depicted a high level block diagram of an exemplary data processing system 100 in accordance with one embodiment. In some embodiments, data processing system 100 may be, for example, a symmetric multiprocessor (SMP) system including a plurality of processors 102a-102n, each coupled for communication to a system fabric 104, which may include one or more bused or switched communication links. For example, data processing system 100 may be implemented with an IBM eServer, a product line of International Business Machines Corporation of Armonk, N.Y. In alternative embodiments, a data processing system with a single processor 102 may be utilized.

In the depicted embodiment, each processor 102 is preferably realized as a single integrated circuit chip having a substrate in which semiconductor circuitry is fabricated as is known in the art. As shown, processor 102 includes a plurality of processor cores 110 that process data through the execution and/or processing of program code, which may include, for example, software and/or firmware and associated data, if any. Processor 102 further includes cache memory 112 providing one or more levels of relatively low latency temporary storage for instructions and data retrieved from lower levels of the data storage hierarchy. In addition, processor 102 includes an integrated memory controller 114 that controls access to an associated one of off-chip system memories 116.

Each processor 102 further includes a fabric interface (FIF) by which processor 102 communicates with system fabric 104, as well as one or more (and preferably multiple) host bridges supporting input/output communication with various input/output adapters (IOAs) 130. In the depicted embodiment, all of the host bridges are implemented as Peripheral Component Interconnect (PCI) host bridges (PHBs) 120, but in other embodiments the host bridges may implement one or more additional or alternative I/O bus standards.

PHBs 120a, 120k, 120m and 120v provide interfaces to PCI local buses 122a, 122k, 122m and 122v, respectively, to which IOAs 130, such as network adapters, storage device controllers, peripheral adapters, etc., may be directly connected or indirectly coupled. For example, PCI IOA 130a is coupled to PCI local bus 122a optionally through an I/O fabric 124a, which may comprise one or more switches and/or bridges. In a similar manner, PCI IOAs 130k and 130l are coupled to PCI local bus 122k optionally through an I/O fabric 124k, PCI IOA 130m is coupled to PCI local bus 122m optionally through I/O fabric 124m, and PCI IOAs 130v and 130w, which may comprise, for example, a display adapter and hard disk adapter, are coupled to PCI local bus 122v optionally through I/O fabric 124v.

Data processing system 100 further includes a service processor 140 that manages the boot process of data processing system 100 and thereafter monitors and reports on the performance of and error conditions detected in data processing system 100. Service processor 140 is coupled to system fabric 104 and is supported by a local memory 142, which may include volatile (e.g., dynamic random access memory (DRAM)) and non-volatile memory (e.g., non-volatile random access memory (NVRAM) or static random access memory (SRAM)). Service processor 140 is further coupled to a mailbox interface 144 through which service processor 140 communicates I/O operations with PCI bus 122a.

Those of ordinary skill in the art will appreciate that the architecture and components of a data processing system can vary between embodiments. For example, other devices and interconnects may alternatively or additionally be used. Accordingly, the exemplary data processing system 100 given in FIG. 1 is not meant to imply architectural limitations with respect to the claimed invention.

Figure 2:
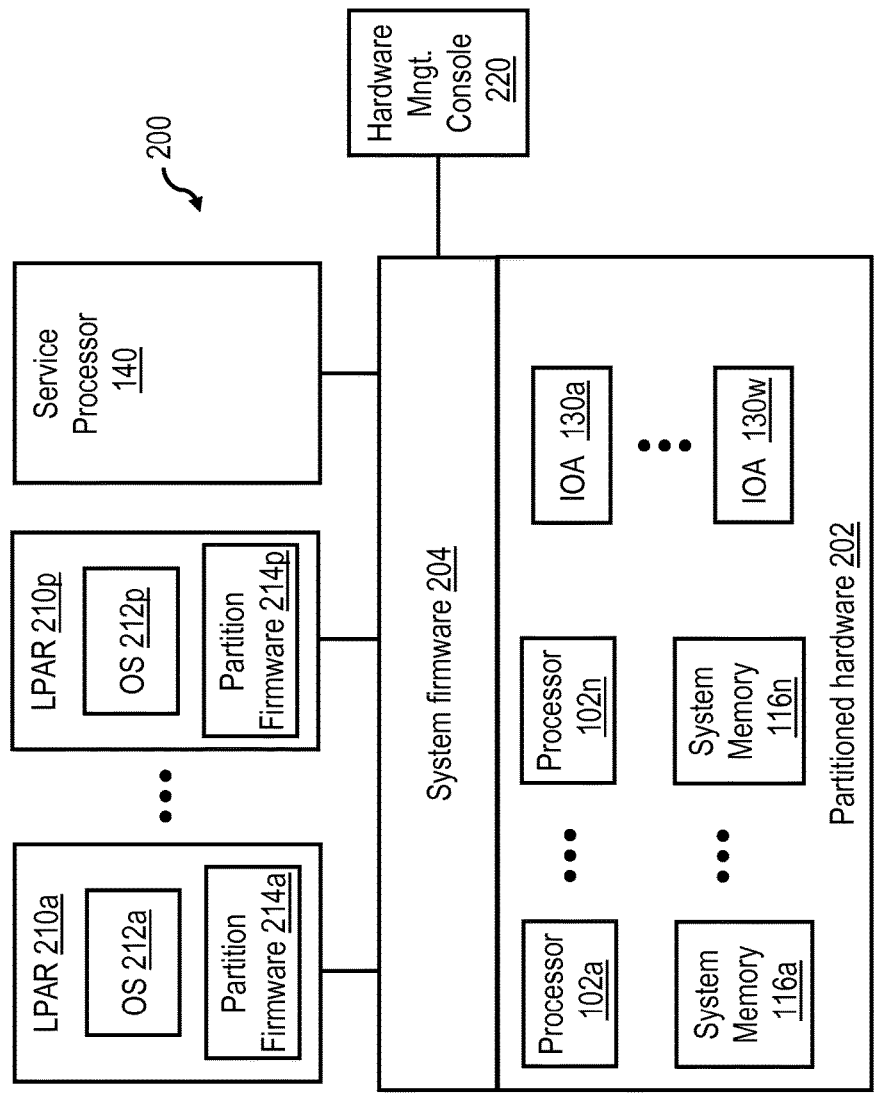
FIG. 2 is a logical view of a data processing system showing the hardware and software resources of the data processing system partitioned into multiple concurrently executing logical partitions (LPARs)

Referring now to FIG. 2, there is depicted a logical view of a data processing system 200 showing the hardware and software resources of the data processing system partitioned into multiple logical partitions (LPARs). Data processing system 200 may have, for example, the same components and/or architecture as data processing system 100 in FIG. 1 and accordingly identifies common components with like reference numerals.

Data processing system 200 has a collection of partitioned hardware 202, including processors 102a-102n, system memories 116a-116n and IOAs 130a-130w. Partitioned hardware 202 may of course include additional unillustrated components, such as additional volatile or nonvolatile storage devices, ports, bridges, switches, etc. The hardware components comprising partitioned hardware 202 (or portions thereof) can be assigned to various ones of logical partitions (LPARs) 210a-210p in data processing system 200 by system firmware 204, also referred to as a virtual machine monitor (VMM) or hypervisor. System firmware 204 supports the simultaneous execution of multiple independent operating system instances by virtualizing the partitioned hardware of data processing system 200.

In addition to the hardware resources allocated by system firmware 204, each of LPARs 210a-210p includes a respective one of multiple concurrently executed operating system instances 212a-212p. In various embodiments, operating system instances 212a-212p, which may include, for example, instances of Linux, AIX and/or Windows, may be homogeneous or heterogeneous. Each LPAR 210 may further include unillustrated application programs, as well as a respective instance of partition firmware 214, which may be implemented, for example, with a combination of initial boot strap code, IEEE-1275 Standard Open Firmware, and runtime abstraction software (RTAS). When LPARs 210a-210p are instantiated, a copy of boot strap code is loaded onto partitions 210a-210p by system firmware 204. Thereafter, system firmware 204 transfers control to the boot strap code, which in turn loads the open firmware and RTAS. The processor(s) 102 assigned to each LPAR 210 then execute the partition firmware 214 of that LPAR 210 to bring up the LPAR 210 and initiate execution of the OS instance 212.

In the logically partitioned environment depicted in FIG. 2, service processor 140 can be used to provide various services, such as processing of errors in LPARs 210a-210p. These services may also function as a service agent to report errors back to a system administrator or vendor of data processing system 200. Operation of the different LPARs 210 may further be controlled through a hardware management console 220. In at least one embodiment, hardware management console 220 can be implemented as a separate data processing system from which a system administrator may perform various functions within data processing system 200 including creating and destroying LPARs 210, as well as reallocating hardware and software resources among LPARs 210.

In a logical partitioned environment such as that depicted in FIG. 2, it is not permissible for the hardware or software resources in one LPAR 210 to consume the resources of or affect the operations in another LPAR 210. Furthermore, to be useful, the assignment of resources to LPARs 210 needs to be fine-grained. For example, it is often not acceptable to assign all IOAs 130 under a particular PHB 120 to the same partition, as that will restrict configurability of the system, including the ability to dynamically reallocated resources between partitions. Accordingly, PHBs 120 are able to assign resources, such as individual IOAs 130 (or portions thereof) to different LPARs 210 while preventing the assigned resources from accessing or affecting the resources of other LPARs 210.

To support such isolation between the resources of different LPARs 210, the I/O subsystem of a data processing system is subdivided into multiple partitionable endpoints. A "partitionable endpoint" or "PE" is defined herein as any component or subcomponent of an I/O subsystem that can be allocated to an LPAR independently of any other component or subcomponent of the I/O subsystem. For example, some PEs may comprise a plurality of IOAs and/or I/O fabric components that function together and, thus, should be allocated as a unit to a single LPAR. Another PE, however, may comprise a portion of a single IOA, for example, a separately configurable and separately assignable port of a multi-port IOA. In general, a PE will be identified by its function rather than by its structure.

Figure 3:
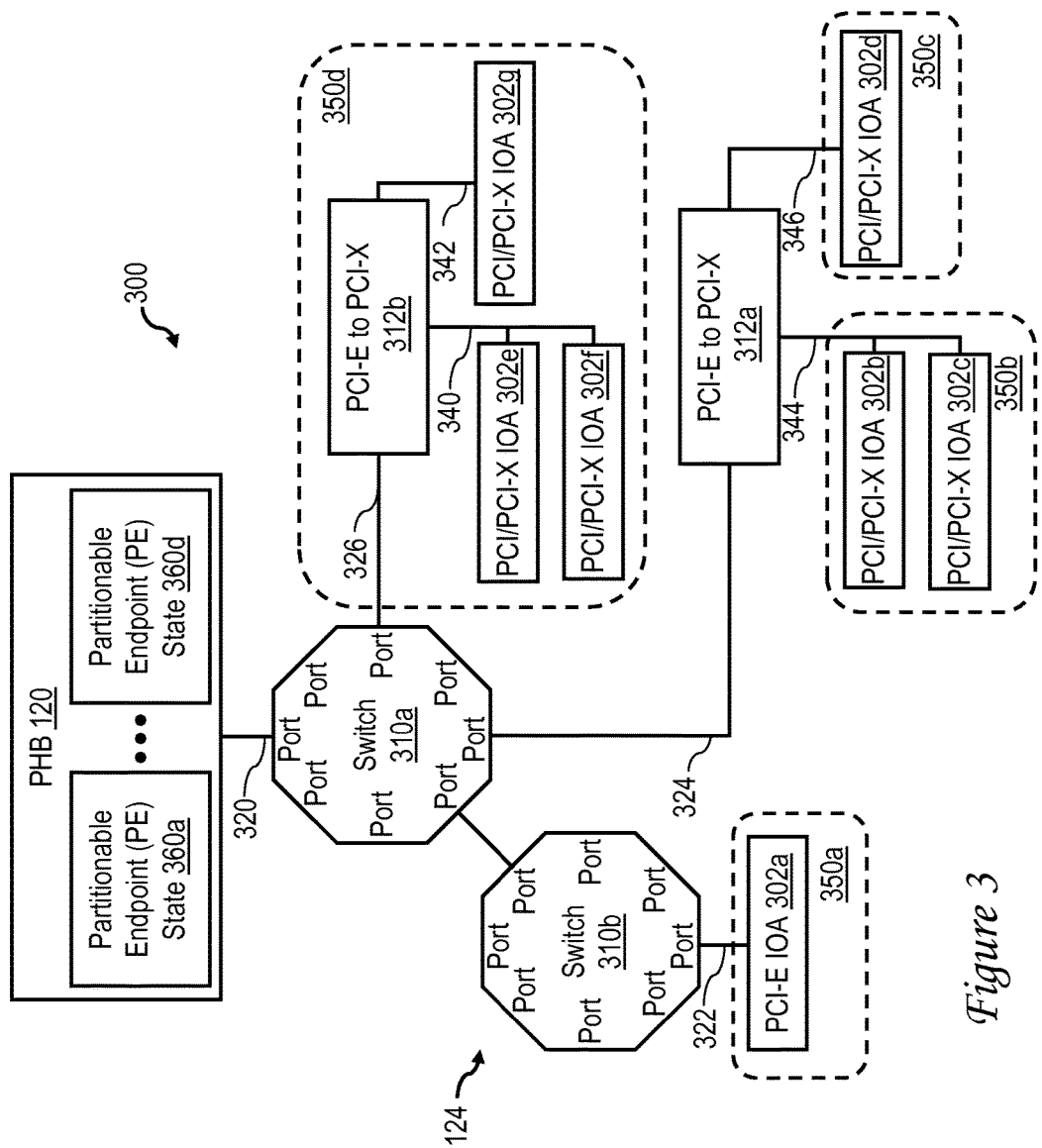
FIG. 3 illustrates an I/O subsystem that provides I/O resource isolation in a data processing system in accordance with one embodiment.

Referring now to FIG. 3, there is depicted a block diagram of at least a portion of the I/O subsystem 300 of a logically partitioned data processing system, such as data processing system 100 of FIG. 1, which exhibits resource isolation between LPARs 210 in accordance with one embodiment.

In the depicted embodiment, I/O subsystem 300 includes a PHB 120 coupled to a plurality of IOAs 302a-302g through an I/O fabric 124. I/O fabric 124 in turn includes switches 310a, 310b, PCI-Express (PCI-E) buses 320, 322, 324 and 326, PCI bridges 312a and 312b, and secondary buses 340, 342, 344 and 346.

As further shown in FIG. 3, system firmware 204 groups various components of I/O subsystem 300 to form a plurality of PEs 350a-350d that are each independently assignable to any of the LPARs 210 of the data processing system. In the given example, PE 350a and PE 350c each comprise a single IOA, namely, IOAs 302a and 302d, respectively. PE 350b, in contrast, comprises two IOAs 302b and 302c that must be assigned to the same LPAR 210. PE 350d comprises three IOAs 302e, 302f and 302g and PCI bridge 312b, which function together as a PE and therefore must be assigned to the same LPAR 210. As noted previously, in other embodiments, a PE may include only a portion (e.g., one or more ports) of an IOA.

In I/O subsystem 300, the respective state of each PE, referred to herein as the partitionable endpoint state, is maintained in the associated PHB 120. Thus, for example, PHB 120 of I/O subsystem 300 includes partitionable endpoint state registers 360a-360d, which correspond to and indicate the states of PEs 350a-350d, respectively.

System firmware 204 assigns each PE one or more domain numbers (or requester IDs (RIDs)) that associate its component(s) with that PE. In an exemplary embodiment, the domain number assigned each PE comprises a plurality of fields that can further be used to differentiate between I/O components in the PE. For example, these fields may include:

Bus number (Bus) field: provides the highest level of division between I/O resources, with each bus under a PHB having a unique bus number.

Device number (Dev) field: provides an intermediate level of division between I/O resources, with each IOA on a given bus having a different device number.

Function number (Func) field: provides the lowest level of division between I/O resources, with each distinct function of an IOA having a different function number.

As will be appreciated, the domain number (or RID) supports the division of I/O resources down to the lowest level of I/O functionality. For example, the domain number allows separate functions of a multiple function IOA to be differentiated. In data processing systems that do not require such a fine granularity, the domain number can be defined by the Bus field alone, allowing differentiation between the PEs connected to the same PHB, or by the Bus field together with either the Dev field or the Func field to permit differentiation between IOAs of a PE or differentiation between functions of an IOA in a PE that contains a multiple function IOA. The sparseness of the domain number space consisting of the Bus, Bus/Dev, or Bus/Dev/Func fields makes it desirable in many cases to condense the domain number space defined by these fields to something less sparse for internal usage by the PHB 120.

Among the isolation functionalities included in PHB 120 of FIG. 3 is the capability to isolate PE error domains. In logically partitioned data processing systems, different PEs may be assigned to different LPARs. Accordingly, PHBs 120 enable an error occurring in one PE to be isolated to the particular LPAR to which the PE is assigned. More particularly, each PHB 120 includes the capability of stopping I/O operations to and from a PE when an error is detected (referred to as the Stopped state). The stopping of I/O operations is preferably accomplished in such a way that:

1. The PE is prevented from completing an I/O operation in error,
   a. such that the PE does not propagate an error to any LPAR, and
   b. such that a requester of the I/O operation does not use erroneous data.

2. The stopping of operations should appear to a device driver to be isolated to just that device driver.
3. Software (at the device driver level or above) for one PE does not introduce an error that can cause another PE to enter the Stopped state.
4. Fault information for problem determination can be captured after the Stopped state occurs.
5. Firmware can access the configuration space below the PHB when any or all of the PEs are in the Stopped state.

In order to achieve error handling in accordance with these criteria, each PHB preferably provides isolation functionality that identifies a particular error domain for an I/O configuration operation. In a preferred embodiment, the configuration operation error domain capability is enabled by implementing a configuration PE number field in a register of the PHB, which field can be set by the system firmware. In addition, in a preferred embodiment, each PHB determines one or more PE numbers affected by an I/O message and routes the I/O message to only software specific to controlling those PE(s).

In addition to providing effective isolation functionality, it is also desirable to reduce the size of data structures within PHBs utilized in handling routine messages, such as DMA messages and I/O error message, particularly in embodiments in which PHBs are integrated into a common integrated circuit chip with the processor. Accordingly, as discussed further herein below, the footprint of data structures implemented within PHBs can be reduced by an improved determination of the PE(s) affected by I/O messages, such as DMA and I/O error messages.

Figures 4A, 4B:
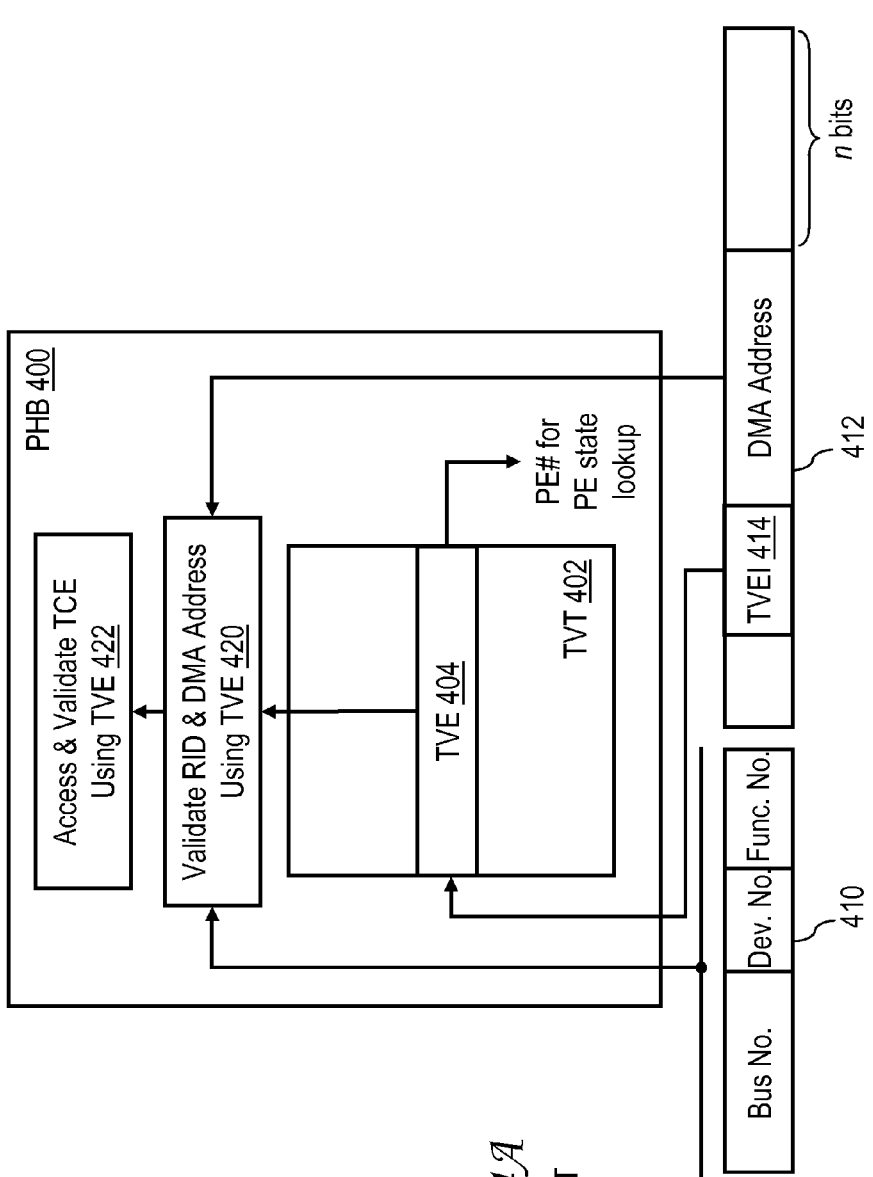
FIG. 4A depicts a conventional Peripheral Component Interconnect (PCI) host bridge (PHB)
FIG. 4B illustrates a conventional Translation and Validation Entry (TVE) of a Translation and Validation Table (TVT) in the PHB of FIG. 4A.

Referring now to FIG. 4A, there is depicted a conventional PHB 400 as described in U.S. Pat. No. 7,398,427, which is implemented in an integrated circuit chip separate from the processor. PHB 400 includes a wide data structure referred to as Translation and Validation Table (TVT) 402. TVT 402 includes a plurality of Translation and Validation Entries (TVEs) 404. As shown in FIG. 4B, each conventional TVE 404 comprises a number of fields including Requester ID (RID) and RID Validate Control field 430 specifying a RID and control information for validating the RID, a PE# field 432 indicating a PE associated with the RID, a Translation Control Entry (TCE) table size field 434, an I/O page size field 436, and a TCE table start address field 438 indicating the base address of the TCE table for the specified PE.

PHB 400 validates RIDs of Direct Memory Access (DMA) requests and translates RIDs to particular PEs by reference to TVT 402. As shown, PHB 400 receives a Direct Memory Access (DMA) packet including a RID 410 (which comprises a bus number, a device number and a function number) and a DMA address 412. Several bits of DMA address 412 form a TVE index (TVEI) 414 into TVT 402 that selects a particular TVE 404 for access. Once the TVE 404 is selected, the content of PE# field 432 is read out to determine the current state of the PE. In addition, the content of RID and RID Validate Control field 430 is compared with incoming RID 410 as shown at block 420. If RID 410 does not match the RID specified in field 430, PHB 400 does not permit the requested DMA operation to be performed. As indicated at block 422, PHB 400 also truncates the low order n bits of DMA address 412 (where $2^n$ is the I/O page size specified by I/O page size field 436 of the selected TVE 404) and compares the remaining DMA address bits below TVEI 414 with TCE table size field 434 of the selected TVE 404. If DMA address 412 specifies an address past the end of the relevant TCE table, PHB 400 disallows the DMA operation. If, on the other hand, the validations shown at block 420 and 422 are successful, PHB 400 performs the requested DMA operation utilizing the DMA address-to-real address translation contained in the in-memory TCE table for the PE, which is pointed to by the contents of TCE start address field 438.

It should be noted that the conventional TVE 404 depicted in FIGS. 4A-4B contains numerous multi-bit fields, and consequently conventional TVT 402 is a large data structure that requires considerable die area. In addition, each PE does not have use of TVEI field 414 of DMA address 412 for its own application, meaning that the DMA address space is carved into different discontiguous spaces for the various PEs.

Figures 5A, 5B:
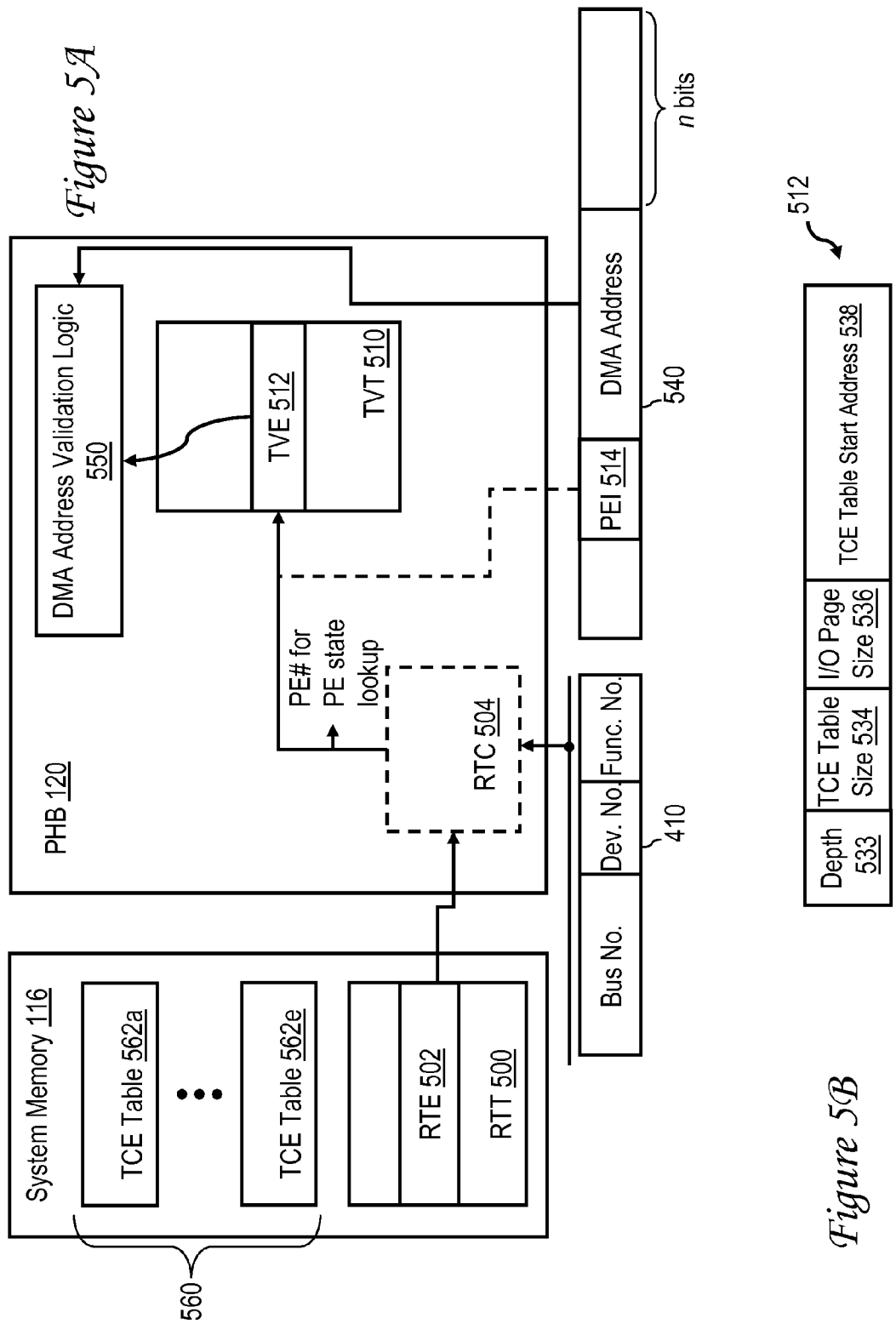
FIG. 5A depicts an improved Peripheral Component Interconnect (PCI) host bridge (PHB) in one exemplary embodiment.
FIG. 5B illustrates an improved Translation and Validation Entry (TVE) of a Translation and Validation Table (TVT) in the PHB of FIG. 5A.

With reference now to FIG. 5A, there is illustrated a more detailed view of an improved PHB 120 in accordance with one embodiment. In general, it is desirable to reduce the die area of PHB 120, particularly in preferred embodiments in which PHB 120 is integrated within the integrated circuit chip of processor 102 as shown in FIG. 1. One factor contributing to the reduction in the die area of PHB 120 is a reduction in the size of data structures within PHB 120 utilized to validate and translate DMA and I/O error messages received from various I/O components, such as IOAs 130, I/O bridges 312, and switches 310. Specifically, as detailed further below, the 16-bit RID field and PE# field formerly found in each conventional TVE 404 can be removed, leading to a significant reduction in the width of TVEs and a concomitant reduction in the overall footprint of the TVT and PHB 120.

In the arrangement shown in FIG. 5A, a RID Translation Table (RTT) 500, which may be populated and maintained, for example, by system firmware 204 based upon its allocation of I/O resources among LPARs 210, includes a plurality of RID Translation Entries (RTEs) 502. Each RTE 502 associates a respective RID, such as conventional 16-bit PCI RID 410, with a PE. RTT 500 can be implemented either in PHB 120, or more preferably, in an off-chip storage location, such as system memory 116. In embodiments in which RTT 500 is implemented off-chip, PHB 120 can optionally include a small on-chip RID Translation Cache (RTC) 504 to provide lower latency access to copies of the most recently accessed RTEs 502.

FIG. 5A further illustrates that PHB 120 includes a streamlined TVT 510 including a plurality of TVEs 512. As depicted in FIG. 5B, each TVE 512 comprises a small number of bit fields including a depth field 533 indicating a configurable number of levels of in-memory TCE data structure 560, a Translation Control Entry (TCE) table size field 534 indicating a configurable table size of each of the TCE table(s) 562 for the PE originating the DMA, an I/O page size field 536 indicating a configurable size of pages in the I/O address space, and a TCE table start address field 538 indicating the base address of the in-memory TCE table 560a for the source PE. It should be noted upon comparison to FIG. 4B that TVEs 512 lack fields corresponding to conventional fields 430 and 432, resulting in a significant size reduction in TVT 510.

As noted above, depth field 533 indicates a configurable number of levels of in-memory TCE data structure 560. Thus, for a configuration in which all TCEs for a given TVE 512 are held in a TCE data structure 560 having a single level (i.e., only including TCE table 562a), depth field 533 would indicate a depth of one. Similarly, for a configuration in which TCEs for a TVE 512 are organized in a TCE data structure 560 including five TCE tables 562a-562e, depth field 533 would indicate a depth of five. The inclusion of depth field 533 in TVE 512 thus configurably supports the use of a TCE data structure 560 that, due to its large size or other considerations, can not be stored contiguously within system memory 116.

In TCE table configurations in which multiple levels are utilized, two or more TCE tables 562 are preferably implemented as linked tables, with each lower level table being accessible via a pointer stored within a higher level TCE table 562. In a first multi-level embodiment, a first (or direct) TCE table 562a is directly linked from TVE 512, and one or more indirect TCE table(s) 562 are linked from the direct TCE table 562a. In an alternative second multi-level embodiment, each of TCE tables 562 includes multiple address translation entries as well as a pointer to the next lower level TCE table 562. The exception is that the last TCE table 562 only includes multiple address translation entries, but does not include a pointer entry (or includes a pointer entry containing a null pointer).

In the embodiment depicted in FIG. 5A, PHB 120 performs address translation by combining the contents of TCE table start address field 538 with mid-order bits of DMA address 540 to identify a specific TCE in TCE data structure 560 to be used for address translation in order to invoke performance of the requested DMA operation. 540 Specifically, the mid-order bits of DMA address 540540 include one or more TCE indices, each corresponding to a particular TCE table 562 within TCE data structure 560. In this embodiment, PHB 120 accesses a first (or direct) TCE table 562a using a starting (or base) address for the direct TCE table 562a from field 538 of TVE 512 and an offset from that base address specified by a first TCE index in DMA address 540. If the first TCE accessed by the offset specified by the first TCE index is a translation entry (as would be the case for configuration in which TCE data structure 560 includes only a single level), then the translation in the first TCE is used to translate DMA address 540 to a physical (real) address. If, however, the first TCE is a pointer entry containing a pointer to an indirect TCE table 562, then PHB 120 additionally accesses a second TCE in the indirect TCE table 562 utilizing the pointer and an offset from that pointer specified by a second TCE index in DMA address 540. 540 PHB 120 continues to access TCEs in indirect TCE tables 562 using pointer addresses and successive TCE indices from the DMA address 540540 until a TCE containing the required address translation is reached.

Figure 6:
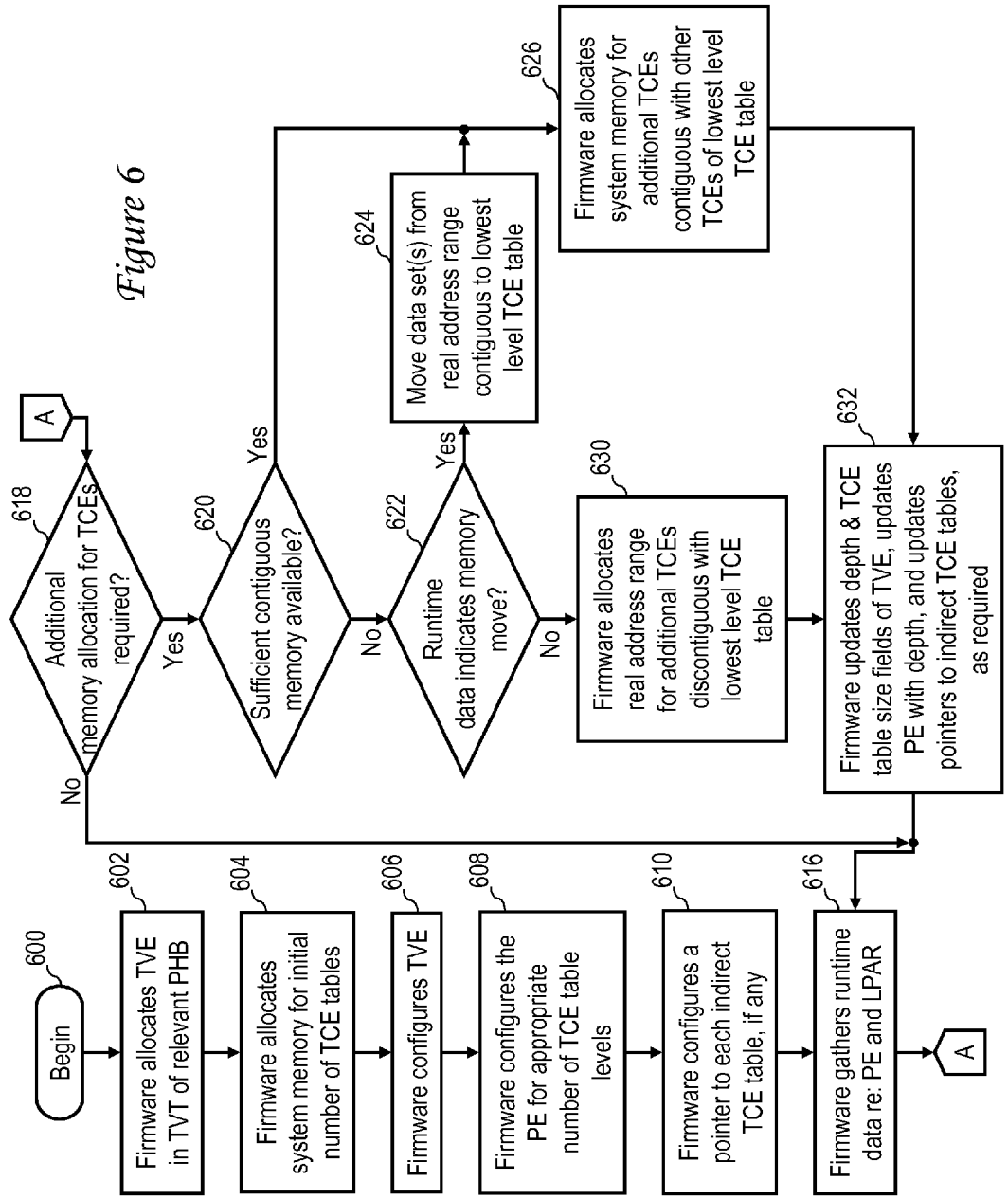
FIG. 6 depicts a high level logical flowchart of an exemplary method of implementing a configurable TCE data structure that can be configured to implement one or more levels of TCE tables in accordance with one embodiment.

Referring now to FIG. 6, there is depicted a high level logical flowchart of an exemplary method of implementing a configurable TCE data structure 560 in accordance with one embodiment. Upon reference to the illustrated process, it should be appreciated that the illustrated configurability of TCE data structures can be performed at a desired level granularity, for example, per PE or for all PEs in an LPAR.

The process begins at block 600 and then proceeds to blocks 602-610, which illustrate system firmware 204 performing an I/O initialization process, for example, in support of deployment of a PE in an LPAR of data processing system 100. In particular, at block 602, system firmware 204 allocates a TVE 512 in the TVT 510 of the PHB 120 supporting the newly deployed PE. In addition, at block 604, system firmware 204 allocates system memory 116 for an initial number of TCE table(s) 562 for the newly allocated TVE 512. Because performance is generally improved when a TCE data structure 560 is configured with a single TCE table 562a, system firmware 204 preferably allocates a contiguous range of memory addresses for a single TCE table 562a at block 604. For ease of memory management, the contiguous range of memory is preferably selected to have one of a plurality of configurable memory page sizes (e.g., 4 KB, 64

KB, 16 MB, 32 MB, 128 MB, etc.) supported by data processing system 100. However, in cases in which allocation of a single TCE table 562 is not possible due, for example, to memory fragmentation, the initial number of TCE tables 562 allocated at block 604 is preferably selected to minimize the number of table levels while providing storage for sufficient TCEs to translate the I/O address range addressable by the PE. It should be noted that the initial number of TCE tables 562 selected at block 604 may differ for that employed for one or more other TVEs 512 in the same TVT 510 and may further differ from the number employed for one or more TVEs 512 in the TVTs 510 of other PHBs 120 in data processing system 100. At block 606, system firmware 204 configures the TVE 512 allocated at block 602 to appropriately reflect in fields 533-538, the depth of TCE table(s) 562 for the corresponding PE, the size of the TCE table(s) 562, the I/O page size to be employed by the PE, and the base address of the direct TCE table 562a. System firmware similarly configures the PE with the appropriate number of TCE table levels so that the DMA addresses 540 provided by the PE will include a corresponding number of TCE indices (block 608). Further, at block 610, system firmware 204 configures a pointer to each indirect TCE table 562, if any, of TCE data structure 560.

Following the I/O initialization process depicted at blocks 602-610, system firmware 204 places the PE into service in the host LPAR and gathers runtime data regarding the PE and the LPAR during the execution of workloads by the LPAR on data processing system 100. The runtime data gathered at block 616 can include a wide variety of information, including performance capabilities of the PE, utilization of the PE, the priorities of processes utilizing the PE, relative and/or absolute LPAR priorities, idle resources, total resources, memory allocation, memory fragmentation, pending requests for memory allocation, etc. As indicated below, system firmware 204 can configure the TCE data structure 560 of a PE based at least in part on the runtime data gathered at block 616.

Referring now to block 618, system firmware 204 determines whether or not an additional memory allocation is required for the TCEs associated with a given TVE 512. An additional memory allocation may be required, for example, in response to an expansion in the I/O address space addressable by the PE associated with the given TVE 512. In response to a determination at block 618 that no additional memory allocation for TCEs is required, the process returns from block 618 to block 616, which has been described. However, in response to determining at block 618 that an additional memory allocation is required for the TCEs associated with a given TVE 512, system firmware 204 determines at block 620 whether or not a sufficient real address range in system memory 116 contiguous with the lowest level TCE table 562 is currently available (i.e., free or unallocated) for the required memory allocation.

In response to a determination at block 620 that a sufficient real address range in system memory 116 contiguous with the lowest level TCE table 562 is currently available for allocation, system firmware 204 allocates system memory 116 contiguous with the lowest level TCE table 562 for storage of additional TCEs, thus appending the additional TCEs to the lowest level TCE table 562 and retaining the previous number of levels (i.e., depth) of TCE data structure 560 (block 626). It should be appreciated that increasing the length of the lowest level TCE table 562 in this manner can require adjustment of the relevant TCE table size field 534, as described below with reference to block 632. In response to a determination at block 620 that a sufficient real address range in system memory 116 contiguous with the lowest level TCE table 562 is not currently available for allocation, system firmware 204 preferably further determines from the runtime data collected at block 616 whether a sufficient performance benefit would be obtained from reallocating the real address range contiguous to the lowest level TCE table 562 to incur the overhead of that reallocation (block 622). In making this determination, system firmware 204 can utilize inputs, such as the number and size(s) of the data set(s) allocated in the real address range contiguous with the lowest level TCE table 562, the performance of the PE associated with the TCE data structure 560, the relative and/or absolute priority of the LPAR to which the PE is assigned, the type of workload(s) being processed by the LPAR, the priority of the process(es) utilizing the PE, the utilization percentage of the PE, etc. In response to an affirmative determination at block 622, system firmware 204 incurs the overhead of moving the data set(s) residing in the real address range contiguous to the lowest level TCE table 562 to other location(s) in system memory 116. The process then proceeds to block 626, which has been described.

Returning to block 622, in response to a determination that the potential performance benefit that would be obtained by reallocating the real address range contiguous to the lowest level TCE table 562 is not sufficient to incur the overhead of reallocation, system firmware 204 allocates the system memory 116 required to store the additional TCEs at one or more real address ranges in system memory 116 discontiguous with the lowest level TCE table 562. Thus, at block 630 system firmware 204 may add one or more additional levels of TCE tables 562 to the TCE data structure 560 associated with the PE.

The process passes from block 630 to block 632, which illustrates system firmware 204 updating the depth field 533 and TCE table size field 534 in the relevant TVE 512 as required to reflect the additional allocation of system memory 116 to store TCEs at block 626 or at block 630. In addition, if one or more additional levels of TCE tables 562 have been added, system firmware 204 updates the PE with the new TCE table depth. If one or more additional levels of TCE tables 562 have been added, system firmware 204 also updates pointers in TVE 512 and/or TCE table(s) 562 as required to link all TCE tables 562 within the relevant TCE data structure 560. Thereafter, the process returns to block 616, which has been described.

Figure 7:
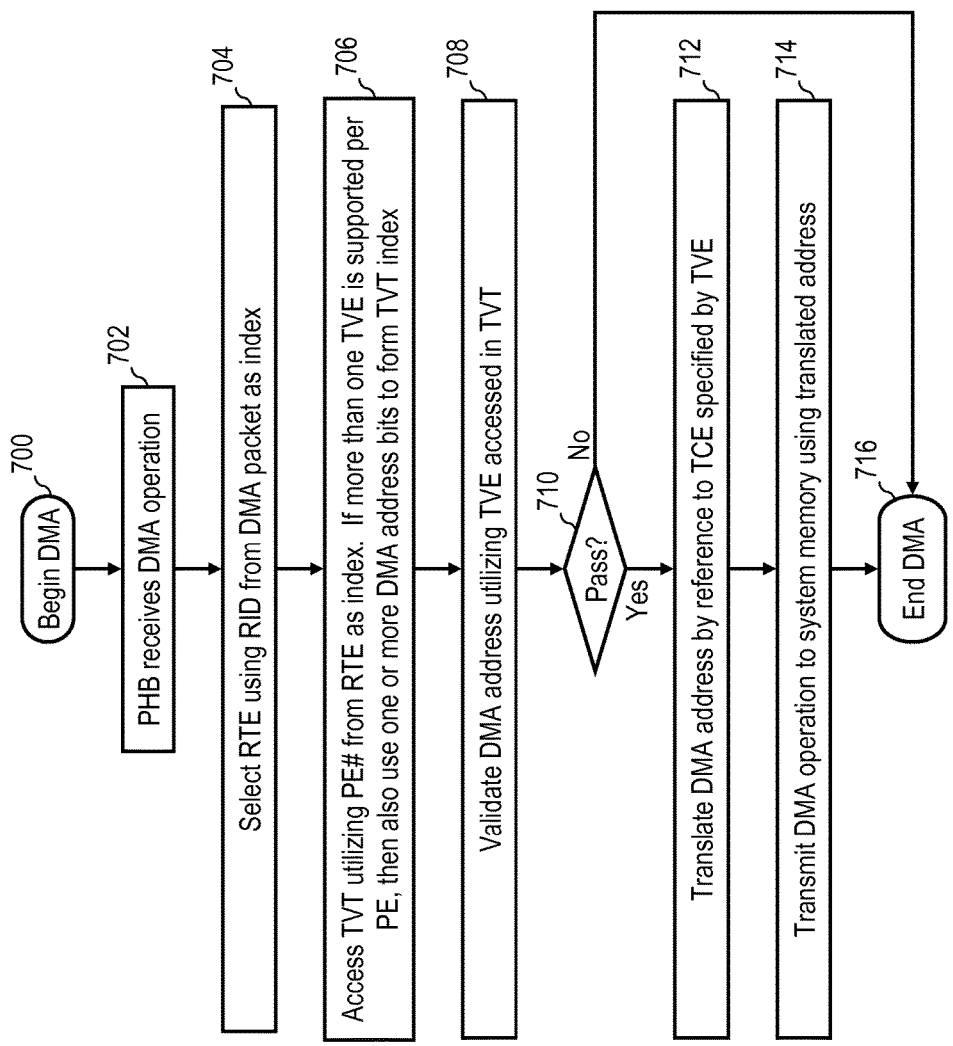
FIG. 7 is a high level logical flowchart of an exemplary process by which a PHB handles a DMA message in accordance with one embodiment.

With reference now to FIG. 7, there is illustrated a high level logical flowchart of the operation of PHB 120 in servicing a DMA request in accordance with one embodiment.

The process begins at block 700 and then proceeds to block 702, which illustrates PHB 120 receiving from one of the I/O components to which it is coupled a Direct Memory Access (DMA) operation including a conventional RID 410 and a DMA address 540. PHB 120 utilizes the RID 410 of the DMA operation to access a particular RTE 502, either from RTC 504 (if present) or from RTT 500 (block 704). The accessed RTE 502 specifies a PE, which PHB 120 utilizes to access the current state of the PE. PHB 120 also utilizes the PE# specified by the accessed RTE 502 to access TVT 510 (block 706). In some embodiments in which each PE has a single associated TVE 512, the PE# directly indexes into TVT 510. In alternative embodiments in which each PE may have one or more TVEs 512 (e.g., to enable multiple I/O page sizes for at least some PEs), then PHB 120 can additionally utilize one or more PE index (PEI) bits 514 from DMA address 540 to select between the multiple TVEs 512 associated with the selected PE. It should be appreciated that the use of PEI 514 does not carve up the DMA address space between different PEs, as does TVEI 414 of FIG. 4A, but only divides the DMA address space within the selected PE's address space, thus advantageously making the entire DMA address space available to each PE.

Following block 706, the process of FIG. 7 proceeds to block 708, which depicts DMA address validation logic 550 in PHB 120 truncating the low order n bits of DMA address 540 (where $2^n$ is the I/O page size specified by I/O page size field 536 of the selected TVE 512) and comparing the remaining upper order DMA address bits with the contents of TCE table size field 534 of the selected TVE 512. As indicated at block 710, if DMA address 540 specifies an address past the end of the relevant TCE table 562, the validation fails, and PHB disallows the DMA operation as indicated by the process terminating at block 716. If, on the other hand, DMA address 540 passes validation, as indicated by a positive determination at block 710, PHB 120 translates DMA address 540 to a real address in system memory 116 (block 712). In one embodiment, PHB 120 performs the address translation by possibly iterative reference to the in-memory TCE table(s) 562 until a translation entry is reached. PHB 120 utilizes the particular TCE pointed to by an address formed by combining the contents of TCE table start address field 538 of the selected TVE 512 and the mid-order bits of DMA address 540 between PEI 514 and the n low-order address bits to traverse through one or more pointer entries in TCE tables 562. PHB 120 then transmits the DMA operation to the IMC 114 of the target system memory 116 using the system memory (e.g., real) address obtained by the address translation in order to invoke performance of the requested DMA operation (block 714). The steps illustrated in 712 and 714 are further described below with respect to FIG. 8. Following block 714, the process shown in FIG. 7 terminates at block 716.

Figure 8:
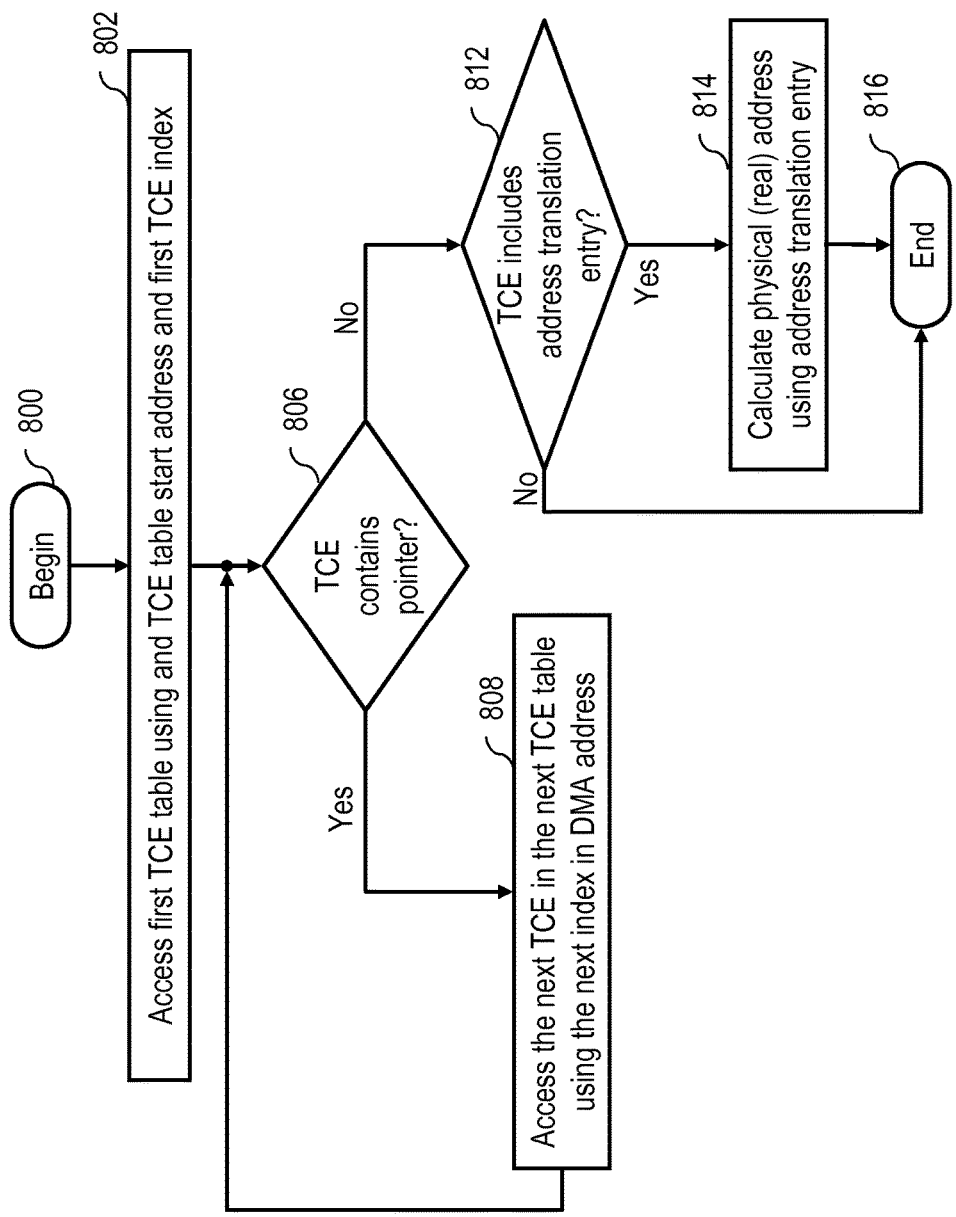
FIG. 8 is a high level logical flowchart of an exemplary process by which a PHB translates an I/O address in accordance with one embodiment.

With reference now to FIG. 8, there is illustrated a high level logical flowchart of an exemplary method for translating a DMA address into a physical address. FIG. 8 is described with reference to the embodiments of FIGS. 5A and 5B for clarity.

The method begins at block 800, and continues at block 802, which illustrates PHB 120 accessing a first (direct) TCE table 562a using the base address specified in TCE table start address field 538 in TVE 512 and the offset specified in the first TCE index of the DMA address 540. At decision block 806, PHB 120 determines whether the accessed TCE contains a pointer to another TCE table 562. If, at block 806, PHB 120 determines that the TCE includes a pointer, the method continues at block 808. If not, the method continues at block 812.

At block 808, PHB 120 accesses the next TCE utilizing the pointer in the last identified TCE and the offset specified by the next TCE index in DMA address 540. As depicted, blocks 806 and 808 are repeated until PHB 120 encounters a TCE that does not contain a pointer to an indirect TCE table 562.

Referring now to block 812, PHB 120 determines whether the most recently identified TCE is an address translation entry. In one or more embodiments, if the most recently accessed TCE does not include a pointer and also does not include an address translation, the referenced TCE does not exist. For example, if the most recently used TCE index of DMA address 540 specifies an address past the end of the relevant TCE table 562, the validation fails, as described in FIG. 7 above, and the method ends at block 816.

If, at block 812, the most recently referenced TCE is an address translation entry, then the method continues at block 814. At block 814, PHB 120 performs the address translation by calculating the real address using the address translation contained in the most recently referenced TCE. PHB 120 then transmits the DMA operation to the IMC 114 of the target system memory 116 using the system memory (e.g., real) address obtained by the address translation in order to invoke performance of the requested DMA operation. Thereafter, the process shown in FIG. 8 terminates at block 816.

In the flow charts described above, the methods may be embodied in computer readable code stored in a computer readable storage medium such that the methods are performed when the computer readable code is executed by a processor on a computing device. In some implementations, certain steps of the method are combined, performed simultaneously or in a different order, or perhaps omitted, without deviating from the spirit and scope of the invention. Thus, while the method steps are described and illustrated in a particular sequence, use of a specific sequence of steps is not necessarily meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 9:
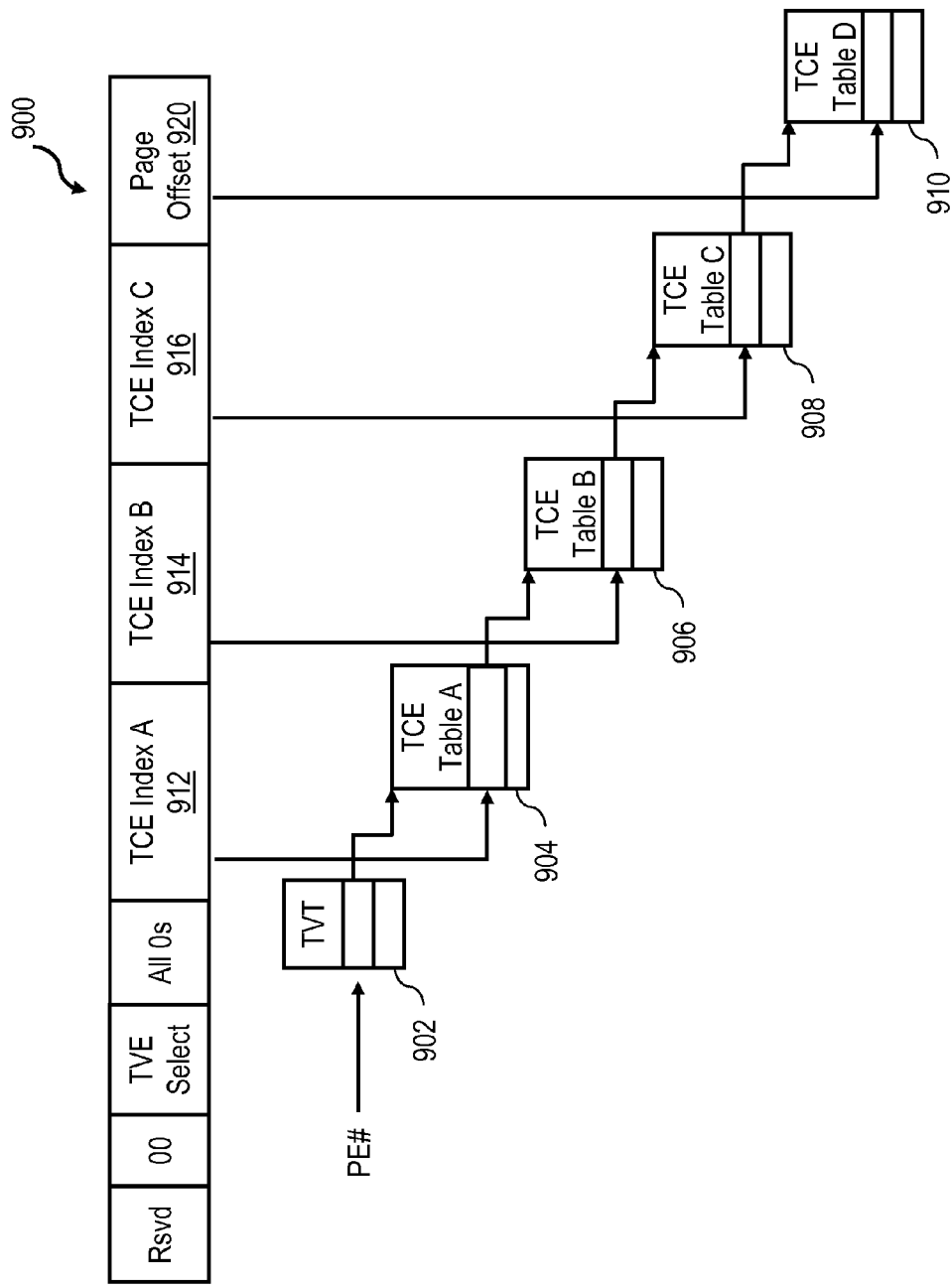
FIG. 9 illustrates the translation of an I/O address to a real memory address by reference to a multi-level TCE data structure in accordance with one embodiment.

FIG. 9 depicts an example DMA address 900, and a dataflow diagram indicating how each portion of DMA address 900 is utilized in the translation of DMA address 900 to a physical (real) address, according to one embodiment. For clarity, FIG. 9 is described with additional reference to the embodiments illustrated in FIGS. 5A-5B, FIG. 7, and FIG. 8.

As depicted, illustrative DMA address 900 includes several fields. Of note, DMA address 900 includes bits used for TVE selection, as well as several TCE indices, including TCE Index A 912, TCE Index B 914, TCE Index C 916, and Page Offset 920. Page Offset 920 is depicted as a final TCE index that points to a final TCE that includes a translation.

The flow diagram begins by PE 120 accessing TVT 902 using PE# from RTE 502 (as depicted in block 706 in FIG. 7). PHB 120 then accesses a first TCE in TCE Table A 904. PHB 120 accesses the first TCE using the base address for TCE table A 904 from field 538 of a TVE 512 in TVT 902, and the offset specified in TCE Index A 912 in DMA address 900 (for example, as depicted at block 804 of FIG. 8). For purposes of the example, the first TCE accessed in TCE table A 904 includes a pointer to the base address of TCE table B 906. Using the offset specified in TCE Index B 914 of DMA address 900, PHB 120 accesses a second TCE within TCE table B 906. Again, the second TCE accessed in TCE table B 906 includes a pointer to the start address of TCE table C 908. Using the offset specified in TCE Index C 916 of DMA address 900, PHB 120 accesses a third TCE within TCE table C 908.

The third TCE accessed in TCE Table C 908 includes a pointer that, for purposes of the illustrated example, points to the base address of the memory page containing TCE table D 910. Using the page offset 920 from DMA address 900, PHB 120 accesses the TCE of TCE table D 910. The final accessed TCE is a translation entry, which PHB 120 uses to translate the DMA address to a physical (real) address in order to invoke performance of the requested DMA operation.

As has been described, in one embodiment, in response to a determination to allocate additional storage, within a real address space employed by a system memory of a data processing system, for translation control entries (TCEs)

that translate addresses from an input/output (I/O) address space to the real address space, a determination is made whether or not a first real address range contiguous with an existing TCE data structure is available for allocation. In response to determining that the first real address range is available for allocation, the first real address range is allocated for storage of TCEs, and a number of levels in the TCE data structure is retained. In response to determining that the first real address range is not available for allocation, a second real address range discontiguous with the existing TCE data structure is allocated for storage of the TCEs, and a number of levels in the TCE data structure is increased.

The foregoing description has been presented for purposes of illustration and elaboration, and is not intended to be exhaustive or limited to the structures and processes disclosed. Many modifications and variations will be apparent to those of ordinary skill in the art. Various embodiments were chosen and described in order to best explain the principles of operation, the practical application, and to enable others of ordinary skill in the art to understand and apply the disclosed teachings in various embodiments with any modifications suitable for the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or, alternatively, a computer readable storage medium. In some embodiments, aspects of the present invention may be embodied within a data replication module (e.g., FPGA or firmware) and implemented in firmware or logic. These embodiments can also be referred to as a "data replication module" or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following storage devices: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, but does not include transitory transmission or signal media. In the context of this document, a computer readable storage medium may be any tangible storage device that can store a program for use by or in connection with an instruction execution system, apparatus, or device.

In the alternative to a computer readable storage medium, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF signals, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the present invention has been particularly shown as described with reference to one or more preferred embodiments, it will be understood by those skilled in the art that various changes in form and detail may be made therein without departing from the spirit and scope of the invention.

What is claimed is:

1. A method of configuring an input/output (I/O) address translation data structure in a data processing system, the method comprising:

in response to determining to allocate additional storage, within a real address space employed by a system memory of a data processing system, for translation control entries (TCEs) that translate addresses from an input/output (I/O) address space to the real address space, a processor of the data processing system determining that a first real address range contiguous with an existing TCE data structure in the system memory is not currently unallocated and available for allocation, wherein the existing TCE data structure has a first number of levels;

based on a determination that the first real address range is not currently unallocated and available for allocation, the processor:

determining whether to move a data set from the first real address range-based on at least one input in a set consisting of (1) a priority of a logical partition of a partitionable endpoint in the I/O subsystem for which addresses are translated by reference to the TCE data structure, (2) a type of workload of the logical partition, (3) a priority of a process utilizing the partitionable endpoint, and (4) a utilization percentage of the partitionable endpoint;

based on a determination to move the data set, moving the data set from the first real address range to a third real address range, allocating the first real address range for storage of the TCEs, and retaining the first number of levels in the existing TCE data structure; and based on a determination not to move the data set, allocating storage for the TCEs in a second real address range discontiguous with the existing TCE data structure and increasing the number of levels in the TCE data structure from the first number to a greater second number.

2. The method of claim 1, and further comprising:

in response to allocation of the second real address range, updating an I/O device and an I/O bridge in the data processing system with the second number of levels in the TCE data structure.

3. The method of claim 1, and further comprising:

in response to allocation of the second real address range, setting a pointer in the TCE data structure to point to the second real address range.

4. The method of claim 1, and further comprising:

based on a determination that the first real address range is currently unallocated and available for allocation, the processor allocating the first real address range for storage of the TCEs and retaining the first number of levels in the TCE data structure.

\* \* \* \* \*